United States Patent

[11] 3,609,466

| | | |
|---|---|---|
| [72] | Inventor | Sotos M. Theodoulou<br>Toronto, Ontario, Canada |
| [21] | Appl. No. | 38,183 |
| [22] | Filed | May 18, 1970 |
| [45] | Patented | Sept. 28, 1971 |
| [73] | Assignee | Clairtone Sound Corporation Limited<br>Rexdale, Ontario, Canada |

[54] POWER SUPPLY WITH DEGAUSSING MEANS
4 Claims, 1 Drawing Fig.

[52] U.S. Cl. .................................................. 317/157.5,
307/150
[51] Int. Cl. .................................................. H01f 13/00
[50] Field of Search ........................................... 317/157.5;
307/150

[56] References Cited
UNITED STATES PATENTS

| | | | |
|---|---|---|---|
| 3,249,795 | 5/1966 | Dietch ........................ | 317/157.5 X |
| 3,433,993 | 3/1969 | Norley ........................ | 317/157.5 X |
| 3,492,543 | 1/1970 | Muranaga .................... | 317/157.5 |

Primary Examiner—Lee T. Hix
Attorney—Rogers, Bereskin & Parr

ABSTRACT: A power supply in which the secondary winding of the power transformer is split into two halves, and two thermistors are provided, one connected between each half winding and ground. A degaussing circuit, consisting of a degaussing coil and a voltage dependent resistor, is connected across the thermistors to produce an AC degaussing voltage centered about ground. Since the thermistors have identical characteristics, the power supply is not unbalanced.

PATENTED SEP 28 1971 3,609,466
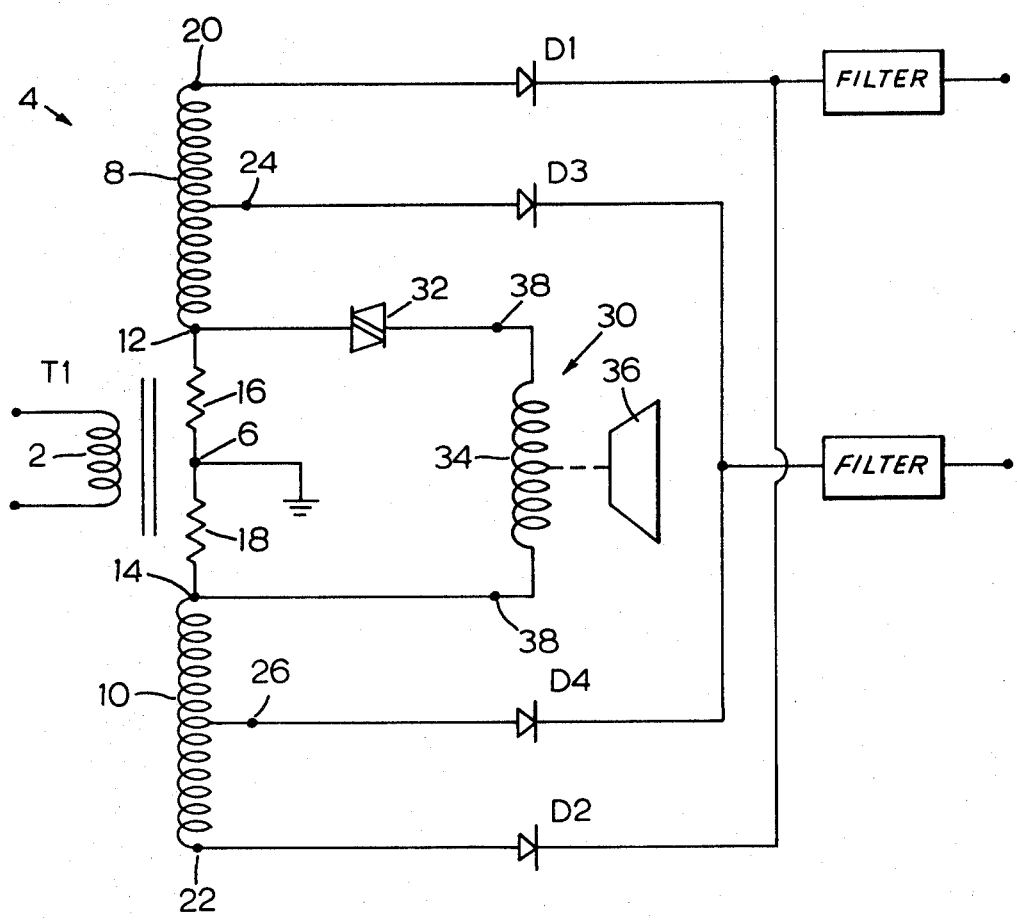
INVENTOR.
SOTOS M. THEODOULOU
BY Rogers, Bereskin, & Parr

POWER SUPPLY WITH DEGAUSSING MEANS

This invention relates to a power supply having a degaussing circuit suitable for use in color television sets.

Color television sets normally require a degaussing coil to remove permanent magnetism from the picture tube each time the set is turned on. In the past, the degaussing system has been energized by placing it in series between the secondary coil of the power transformer and the rectifying means. This had the disadvantage that lower voltages could not be derived from the power transformer without a separate winding.

The invention provides improved means for deriving power from the power supply for the degaussing coil, According to a preferred embodiment of the invention, the secondary winding of the power transformer is split into two halves, and two thermistors are provided, one connected between each of the half windings and ground. A degaussing voltage is derived across the two thermistors. This arrangement is extremely inexpensive and does not unbalance the power supply, since both thermistors have the same characteristics. Since the power supply is not unbalanced, lower voltage taps can be added to the power transformer.

Further objects and advantages of the invention will appear from the following description, taken together with the accompanying drawing, which shows a circuit according to the invention.

The circuit shown in the drawing includes a power transformer T1 having a primary winding 2 and a secondary winding 4. The secondary winding is split into two identical windings 8, 10. The windings 8, 10 have terminals 12, 14 which are connected through thermistors 16, 18 respectively to terminal 6, which is grounded. Windings 8, 10 also have terminals 20, 22 to supply a relatively high voltage, e.g. 70 volts, which is then typically rectified in diodes D1, D2 and then filtered, and low-voltage taps 24, 26 to supply a lower voltage (which is then typically rectified by diodes D3, D4 and then filtered).

Connected across the thermistors 16, 18 is a degaussing circuit generally indicated at 30. The degaussing circuit consists of a voltage dependent resistor 32 and a degaussing coil 34. The degaussing coil 34 is associated in a conventional manner with the picture tube 36 of a color television set and connects to the power supply at plug-in terminals diagrammatically indicated at 38.

In operation, when the power supply is turned on, an alternating voltage appears across thermistors 16, 18 to energize the degaussing coil 34. As the thermistors 16, 18 warm up, due to the passage of current through them, their resistance drops, causing a gradually diminishing AC current to pass through the degaussing coil 34 to degauss the picture tube. When the voltage across thermistors 16, 18 becomes low enough, the resistance of voltage dependent resistor 32 increases sharply to block conduction through the degaussing coil, since it is undesirable to have the degaussing coil operating when the picture is being used.

Since the thermistors 16, 18 each have the same characteristics, so that each is of the same resistance as the other at all times, the power supply is not unbalanced, and therefore equal and opposite voltages appear at terminals 20, 22 and 24, 26. The arrangement shown therefore provides an extremely inexpensive and effective circuit for energizing the degaussing coil 34, with a minimum of disturbance to the power supply.

A further advantage of the arrangement shown is that the degaussing voltage is centered about ground. Therefore, if a short circuit should occur between the degaussing coil and ground, which occasionally occurs in television sets since the degaussing coil is mounted on a ground frame, the damage to the set will be minimized.

If desired, two identical low-value resistors can be provided, one connected between terminal 6 and each thermistor. Alternatively, a low-value resistor can be connected between terminal 6 and ground. This would shift the degaussing voltage slightly upwardly, but such an arrangement is normally unnecessary and is usually undesirable.

What I claim as my invention is:

1. A power supply with degaussing means, comprising:
   a. a transformer having a secondary winding divided into first and second half windings,
   b. a pair of thermistors, both having the same resistance and temperature characteristics,
   c. means connecting one thermistor between said first half winding and ground, and means connecting the other thermistor between said second half winding and ground, the impedance between each half winding and ground being the same,
   d. rectifying means connected between said first and second windings,
   e. and a degaussing circuit connected across said thermistors, said degaussing circuit including a degaussing coil.

2. Apparatus according to claim 1 wherein each thermistor is connected directly between its associated half winding and ground.

3. Apparatus according to claim 2 wherein said degaussing circuit includes a voltage dependent resistor connected in series with said degaussing coil.

4. Apparatus according to claim 3 wherein each of said first and second half windings includes a first tap at its end remote from its connection to said thermistor and a second tap intermediate said end connected to said thermistor and said first tap, said rectifying means including a pair of diodes connected between said first taps and a pair of diodes connected between said second taps.